United States Patent [19]

Aso et al.

[11] Patent Number: 5,044,450

[45] Date of Patent: Sep. 3, 1991

[54] SPAR-BUOY BORING DERRICK AND MOORING FACILITY

[75] Inventors: Hiroshi Aso; Jyunichi Harada, both of Ikeda, Japan

[73] Assignee: Zeni Lite Buoy Co., Limited, Osaka, Japan

[21] Appl. No.: 485,270

[22] Filed: Feb. 26, 1990

[30] Foreign Application Priority Data

Feb. 28, 1989 [JP] Japan ................................ 1-49157

[51] Int. Cl.$^5$ ........................ E21B 7/128; E21B 7/132
[52] U.S. Cl. ...................................... 175/7; 166/358; 405/202; 175/8
[58] Field of Search ...................... 166/358; 175/8, 17; 405/202, 203, 224

[56] References Cited

U.S. PATENT DOCUMENTS

| | | | |
|---|---|---|---|
| 3,395,755 | 8/1968 | Manning | 175/8 |
| 3,522,709 | 8/1970 | Vilain | 405/202 |
| 4,155,670 | 5/1979 | Stafford | 405/202 |
| 4,284,367 | 8/1981 | Tuson | 405/202 |
| 4,566,824 | 1/1986 | Minier et al. | 405/202 |
| 4,685,833 | 8/1987 | Iwamoto | 405/202 |
| 4,702,321 | 10/1987 | Horton | 175/8 |

Primary Examiner—Bruce M. Kisliuk
Attorney, Agent, or Firm—Koda and Androlia

[57] ABSTRACT

A spar-buoy type boring device including a main pipe and a central pipe installed in the main pipe. The main pipe, which has a service deck at the top and a float near the top so that the float stays underneath the water, is anchored at the bottom to a sinker which is placed on the seabed, and the central pipe with the bottom end opening in the sea is used for guiding boring equipments to the seabed and collecting samples from the seabed.

6 Claims, 5 Drawing Sheets

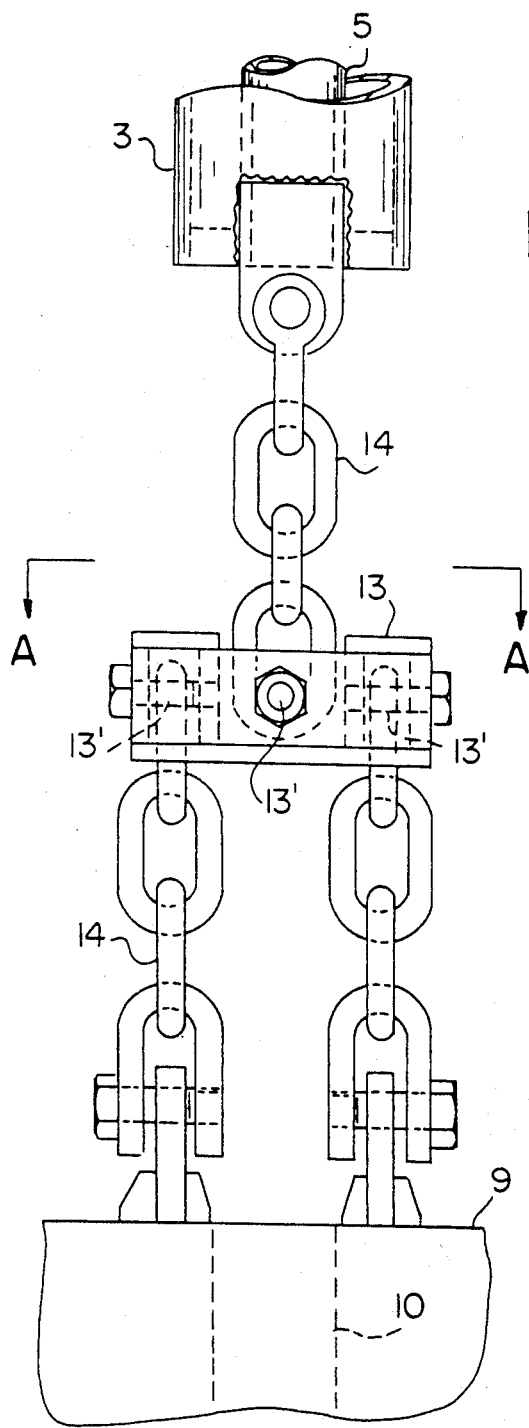
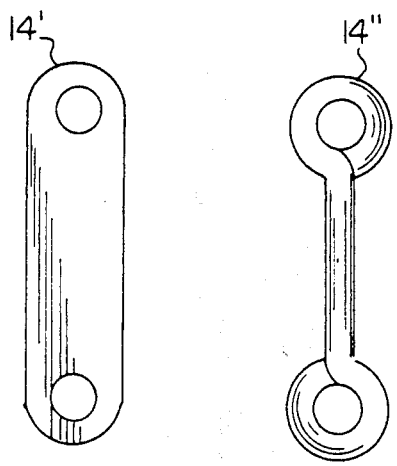
FIG. 3(a)
FIG. 3(b) FIG. 3(c)

SPAR-BUOY BORING DERRICK AND MOORING FACILITY

BACKGROUND OF THE INVENTION

1. Field of the Invention

The present invention relates to a spar-buoy boring derrick for a sea-bottom drilling scaffold which is used for sea-bottom geological survey or boring, etc.

2. Prior Art

In a sea-bottom geological survey or boring work in a relatively shallow area, piles are driven into the sea-bottom, or scaffold piping is assembled onto which a deck is fastened to be used as a scaffold. Also, single column steel pipes are installed straight up on the sea-bottom with their neck moored to anchors on the sea-bottom using mooring ropes. Another method was to lower three or more spuds onto the sea-bottom and pull a hull to the sea level to be used as a scaffold. In a deep area, a steel scaffold derrick was used for a boring scaffold.

Among these methods, the method using a steel scaffold required either a lot of time and effort to move or a large scale facility in order to bore at a prescribed interval, resulting in a huge cost.

SUMMARY OF THE INVENTION

Noting the fact that the pull-in mooring type spar-buoy that has been used for navigational aids can maintain its upright stance stably with minimum slanting caused by the wind or wave and that it is relatively easy to be moved, the present invention conceives a spar-buoy boring derrick for sea-bottom drilling scaffold and its mooring facility for use in a sea-bottom geological survey.

For this purpose, a platform is provided at the top of a column, a buoy is provided in the middle, and the lower end of the column is moored to a sinker by a mooring facility; a buoy is pulled into the water so that the water level comes somewhere in the middle of the column above the buoy and that the buoy stands upright in the water by buoyancy to make a pull-in mooring type spar-buoy scaffold, in which a center pipe is provided so that it runs through the buoy and column, the lower end of the center pipe reaching the bottom plate of the column and opening in the water, and the upper end reaching the water level at least, through which a boring rod is inserted.

The column and the center pipe are of double piping structure and the peripheral of the center pipe is a water-tight hollow to increase the buoyancy of the spar-buoy boring derrick, and the inside of the center pipe is filled with water up to the draught level. A service platform is provided at the top of the column.

The mooring facility is provided with a pair of mooring loops on both sides of the lower end of the column, and the sinker has a hole in the center through which a boring rod runs, and another pair of mooring loops are provided at the top. They are linked with a linkage that has a hollow space in the center for a boring rod to pass therethrough and is supported in two axial directions that are perpendicular to each other and horizontal to the ground level in such a manner that they can slant.

Instead of the linkage, a pair of linking loops at the lower end of the column and another pair of linking loops on the sinker can be liked by a pair of linking pieces to form a linking device via an intermediate loop having supporting shafts that are perpendicular to each other and horizontal to the ground.

The derrick for a boring scaffold can also have a swivel mechanism inserted in the lower end of the column.

With the structure described above, a casing pipe, boring rod, sampler, etc., extend from the service platform established at the top of the column through the center pipe in the center of the mooring facility and further through the center hole of the sinker into the sea-bottom ground to perform the drilling.

The spar-buoy derrick stands in the water with its own buoyancy and does not slant to interfere boring by the wind or wave.

The boring rod is inserted vertically in the center of the mooring facility which is constantly pulled upward by the buoyancy of the spar-buoy derrick so that the mooring facility can slant in any direction without sagging. Thus, the mooring facility can be moored safely even in the wind or wave or by a ship which hits the column.

BRIEF DESCRIPTION OF THE DRAWINGS

FIG. 3(a) is a front view of another type of the mooring facility of the present invention;

FIGS. 3(b) and 3(c) show linking pieces used in the present invention;

DETAILED DESCRIPTION OF THE INVENTION

Figure 1:
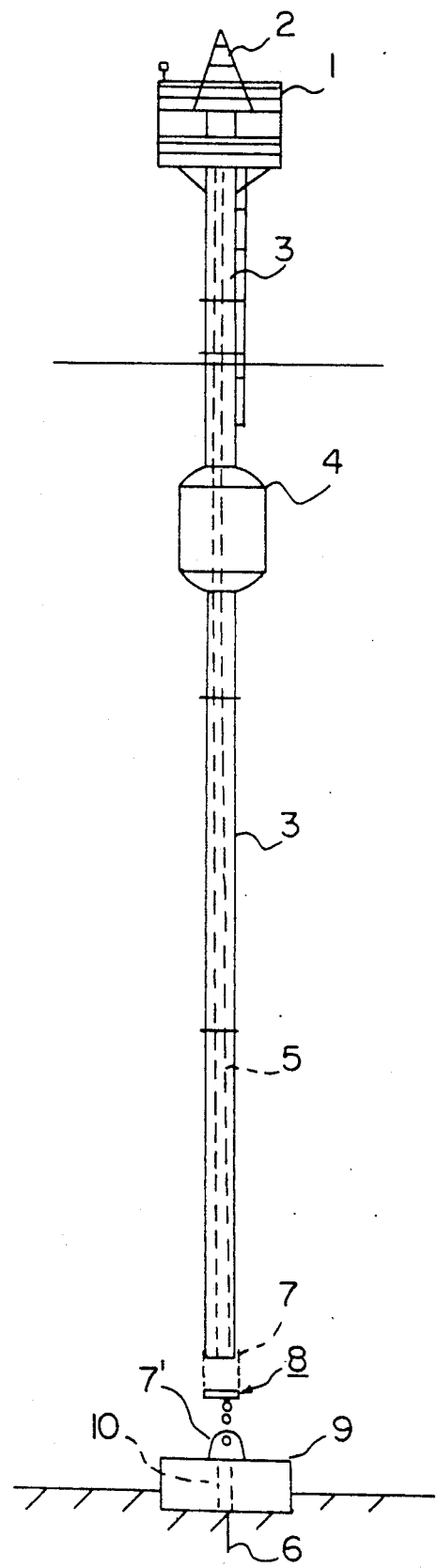
FIG. 1 is a front view of the boring derrick with a spar-buoy and its mooring facility of this invention.

FIG. 1 is an overall front view of an embodiment of the spar-buoy derrick and a mooring facility used therefor.

Reference numeral 1 is a service platform which is established in two stages, 2 is a boring machine, and 3 is a hollow column. The lower service platform is mounted on the top of the column 3, and the upper service platform is installed thereon and supported by supporting rods so that workers can approach the boring area (working point).

Reference numeral 4 is a buoy mounted on the column 3, and 5 is a center pipe. The center pipe 5 is provided in the column 3 and passes through the buoy 4. The lower end of the center pipe 5 is connected to a bottom plate of the column 3 and opens in the water. Reference numeral 6 is a boring rod, etc. A pair of mooring loops 7 is mounted at the lower end of the column 3, and a mooring facility 8 is attached to the mooring loops 7. A sinker 9 connected to the mooring facility 8 has a vertical hole 10 in the center so that the boring rod 6 can pass through.

Figure 2A:
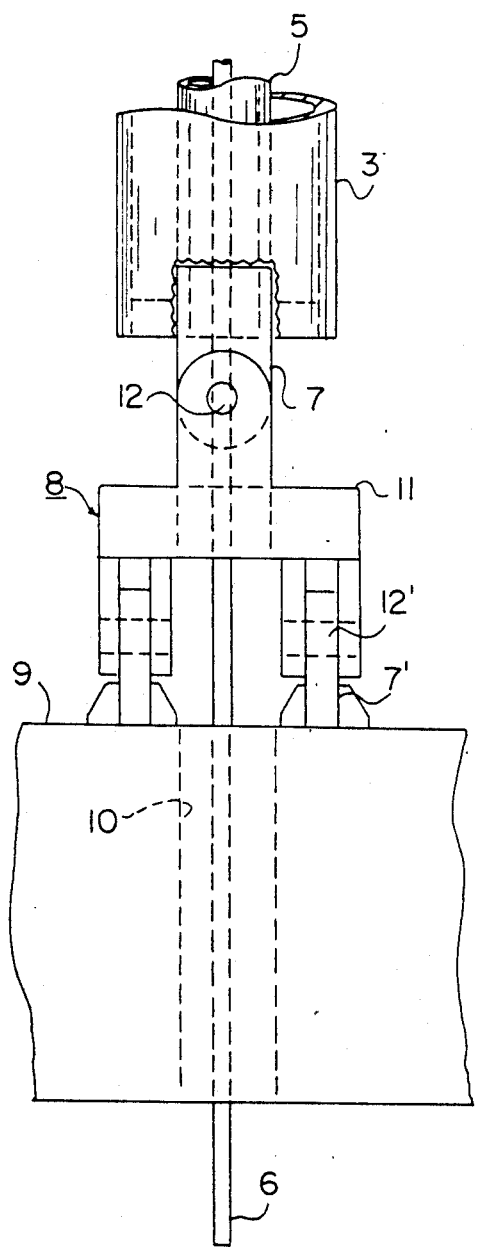
FIG. 2(a) is a front view of the mooring facility.
Figure 2B:
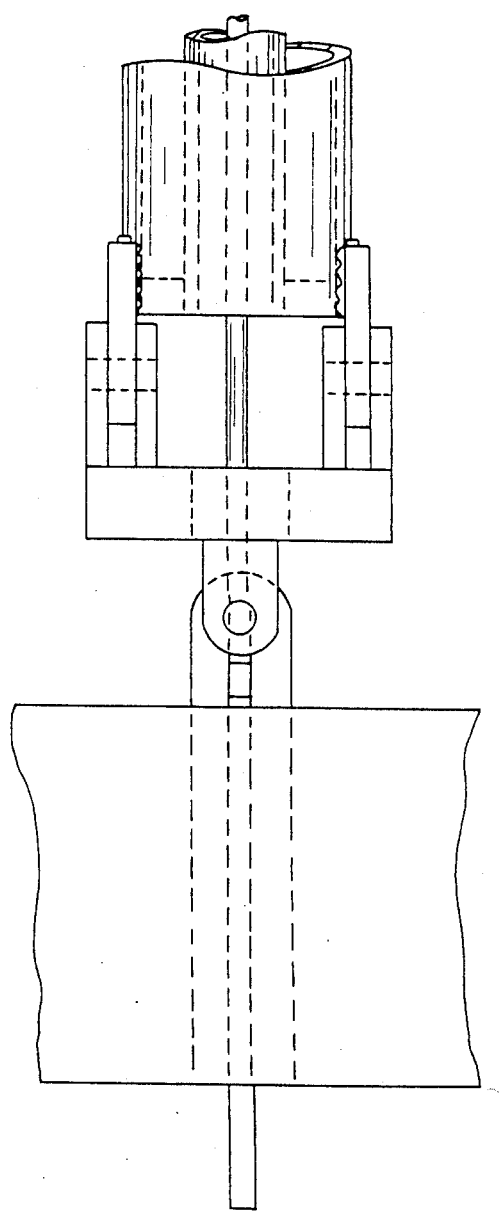
FIG. 2(b) is a side view thereof.

FIG. 2(a) is a front view of the mooring facility 8, and FIG. 2(b) is a side view thereof. A mooring equipment 11 has a hollow space in the center and is connected to the column 3 and the sinker 9 via mooring loops 7 and 7' so that the mooring equipment 11 can slant by shafts 12 and 12' which are arranged perpendicular to each other.

Figure 3D:
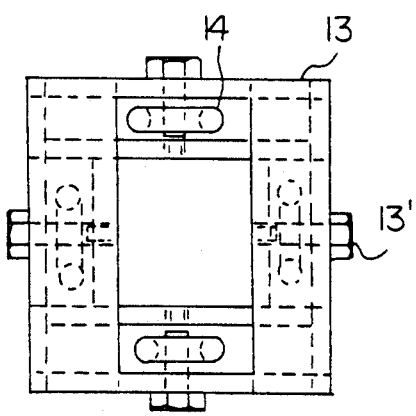
FIG. 3(d) is a view taken along the line A—A of FIG. 3(a)

FIG. 3(a) shows another type of the mooring facility 8. An intermediate loop 13 includes supporting shafts 13' that are perpendicular to each other and is shaped like a loop so that the boring rod can pass through it. Links 14 are short chains, but it can take a form of a plate link 14' as shown in FIG. 3(b) or a bar-shaped link 14" as shown in FIG. 3(c). FIG. 3(d) is a view taken along the line A—A of FIG. 3(a). The length of the link 10 can be adjusted to match the depth of the water.

Figure 3E:
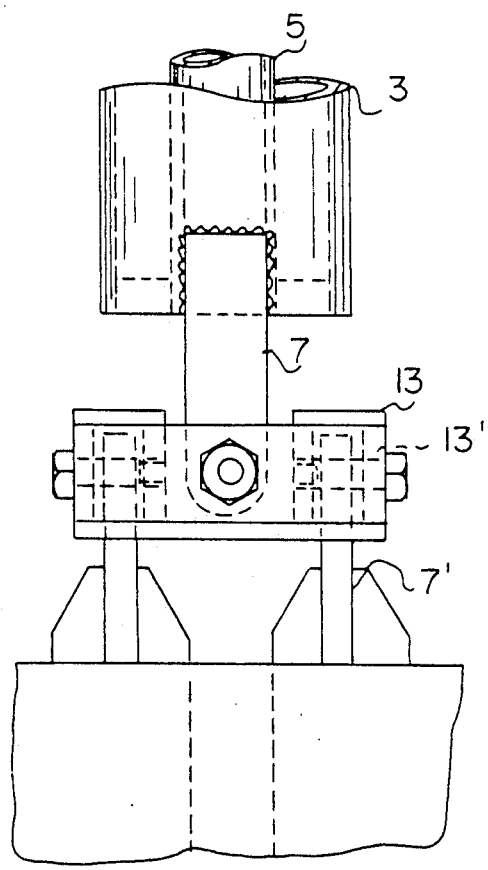
FIG. 3(e) is a front view of still another embodiment of the mooring facility, of the present invention.

FIG. 3(e) shows an embodiment in which the links 14 are not used and the column 3 is connected to the sinker 10 via the loop 13.

Figure 4A:
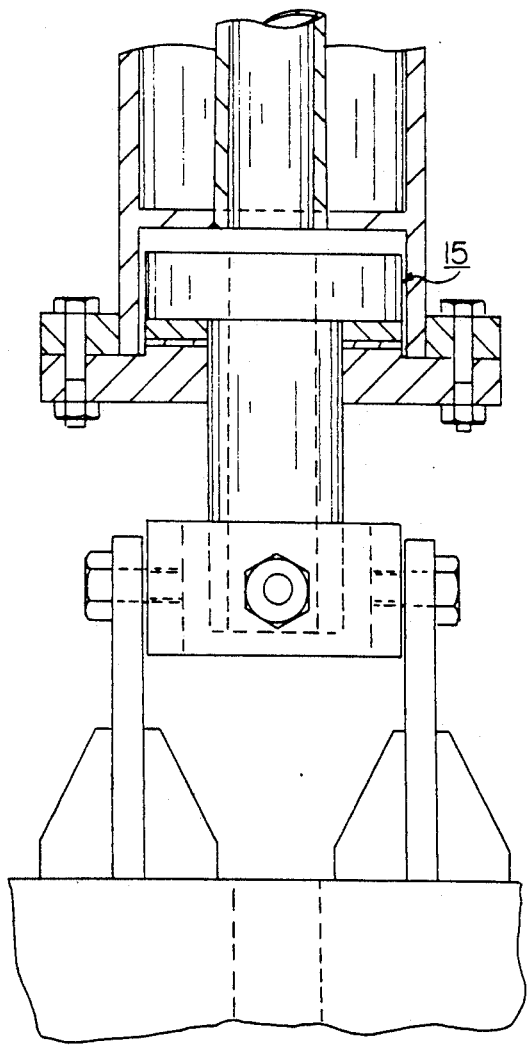
FIG. 4(a) is a partially sectional front view of a swivel mechanism installed in the mooring facility.
Figure 4B:
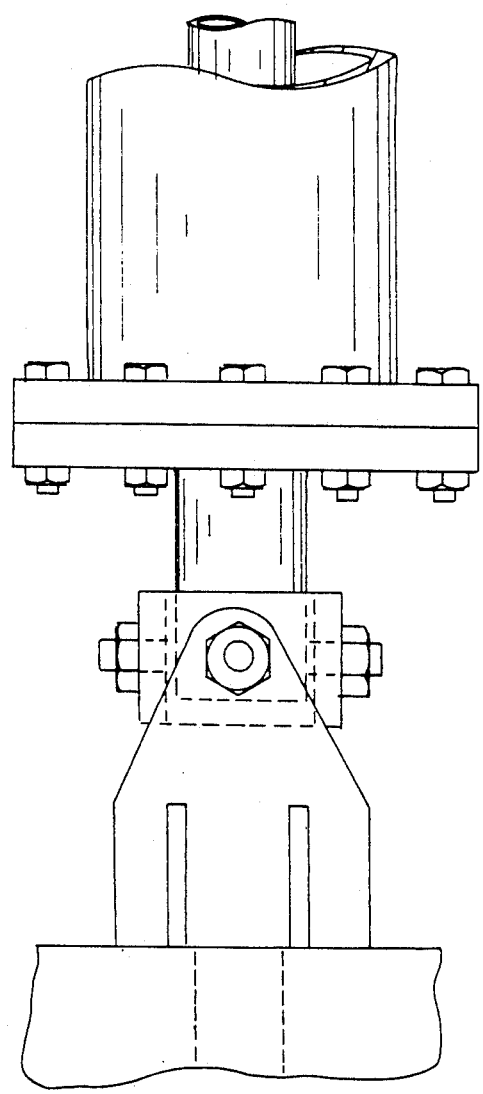
FIG 4(b) is a side view thereof.

In FIG. 4(a), a swivel mechanism 15 with a central hole is inserted in the lower end of the column 3 in order to avoid damages to the mooring facility in case an excessive torsion applies to the column 3 when a ship, etc. collides the buoy. FIG. 4(b) shows the side view thereof.

With the structure described above, a casing pipe, boring rod, sampler and measuring equipment can be extended from a service platform on the boring derrick with a spar-buoy into the sea-bottom ground for boring. Slanting of the boring rod caused by wind or wave can be minimized for smooth boring.

The spar-buoy of this invention can easily be moved to different working spots by lifting it slightly from the sea-bottom ground by lifting the mooring loops attached to the sinker from the service ship, (only a small lifting force is necessary because of the buoyancy of the spar-buoy), providing an economical boring derrick and mooring facility.

We claim:

1. A pull-in mooring type spar-buoy boring derrick which is a spar-buoy scaffold, comprising a column which has a platform at the top, a buoy in the middle and a bottom plate at a lower end and is moored to a sinker at the bottom by a mooring facility to pull the buoy into the water so that the water line comes somewhere on the column above the buoy, and so that the scaffold stands upright in the water by buoyancy, and comprising a center pipe that houses a casing pipe and boring rod, running through the buoy and column, the lower end of said center pipe reaches the bottom plate of the column and the lower end of said center pipe is open in the water and the upper end of said center pipe reaches higher than the water level.

2. A mooring facility for spar-buoy boring derrick in accordance with claim 1, in which said mooring facility comprises a pair of short chains provided on both sides of the lower end of the column and a sinker having a vertical hole running through the center and a pair of short chains at the top are linked with a linkage that has a vertically running hollow in the center and supported by shafts in two directions that are perpendicular to each other and horizontal to the ground.

3. A mooring facility for a spar-buoy boring derrick in accordance with claim 1, in which said mooring facility comprises a pair of short chains at the lower end of the column and a pair of short chains at the top of the sinker are linked with a pair of linking pieces via an intermediate loop having horizontal supporting shafts that are perpendicular to each other.

4. A mooring facility of spar-buoy boring derrick in accordance with claim 2 or 3, in which a swivel mechanism is inserted at the lower end of the column.

5. A spar-buoy type seabed boring device comprising:
a main hollow column provided with a platform at the top and a buoy in the upper middle;
a center pipe coaxially provided in said main hollow column with its top end connected to said platform and its bottom end opened in the water;
a boring rod guided into seabed through said center pipe; and
a sinker connected to said hollow column via a mooring device, said sinker being placed on the seabed so that said buoy stays under the water and said main hollow column stays vertically in the water, said mooring device comprising a pair of short chains at the lower ends of the column and a pair of short chains at the top of the sinker are linked with a pair of linking pieces via an intermediate loop having horizontal support shafts that are perpendicular to each other.

6. A spar-buoy type seabed boring device according to claim 5, wherein said sinker and mooring device are provided with holes at the center thereof respectively so that said holes are positioned underneath said center pipe.

* * * * *